May 9, 1967  J. E. LINDBERG, JR  3,319,239
SENSOR FOR HEAT OR TEMPERATURE DETECTION AND FIRE DETECTION
Original Filed April 1, 1963  3 Sheets-Sheet 1
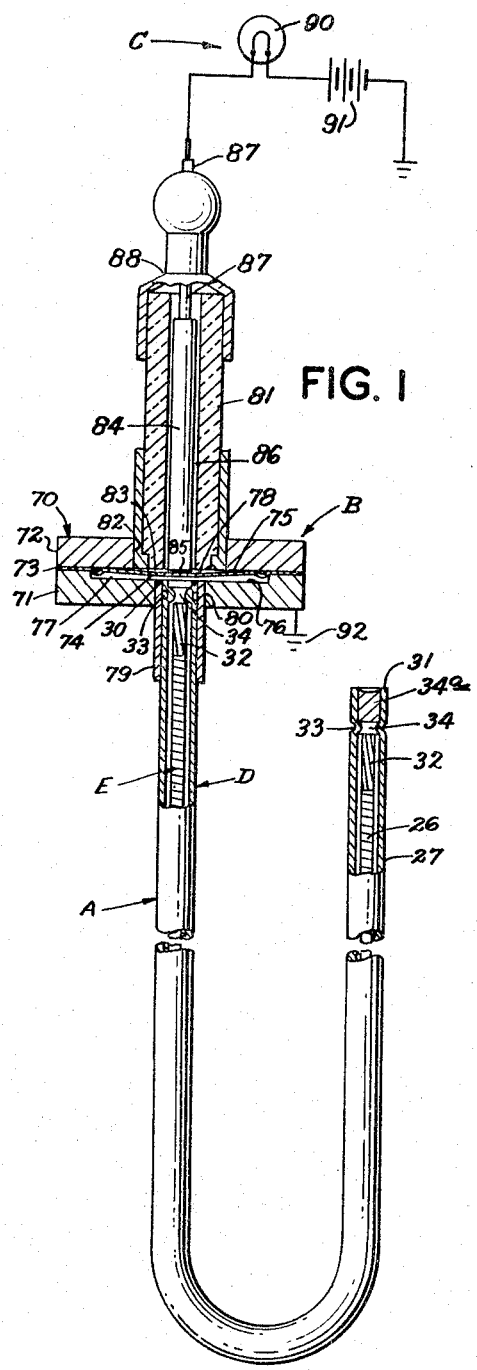
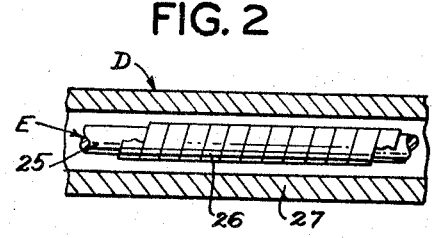
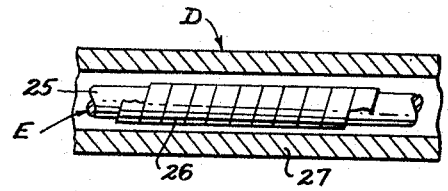
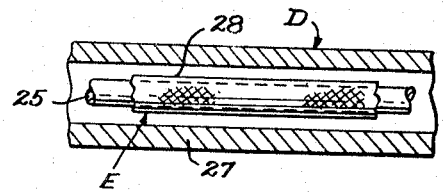
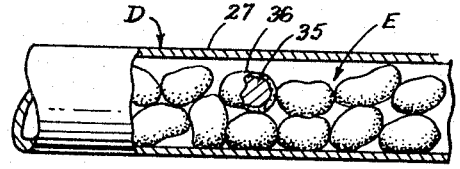
INVENTOR.
JOHN E. LINDBERG, JR.
BY
ATTORNEY May 9, 1967
J. E. LINDBERG, JR
3,319,239
SENSOR FOR HEAT OR TEMPERATURE DETECTION AND FIRE DETECTION
Original Filed April 1, 1963
3 Sheets-Sheet 2
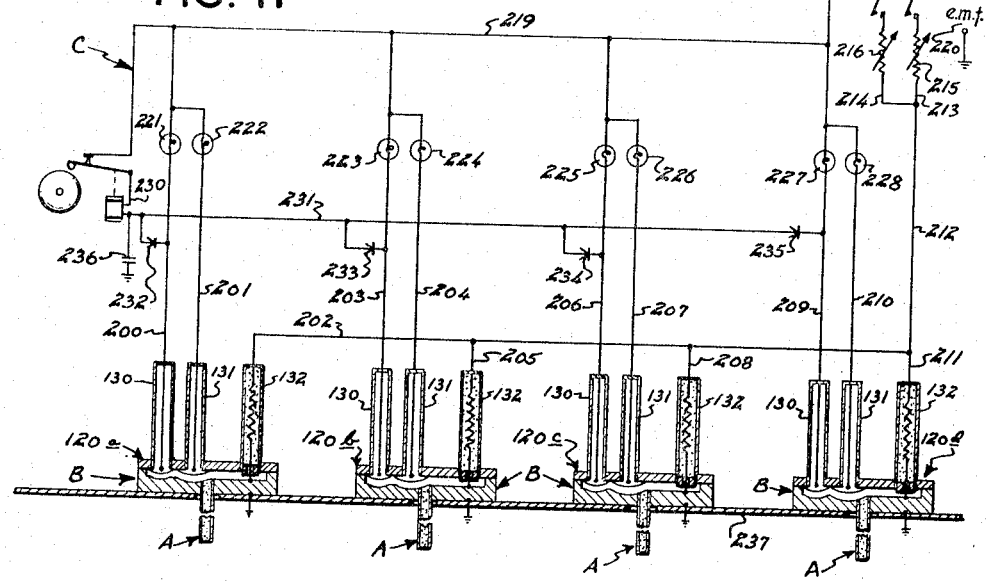
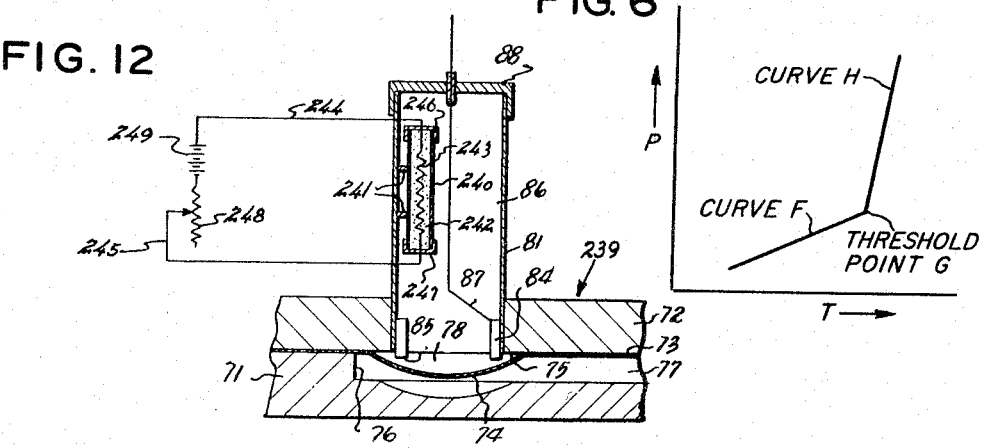
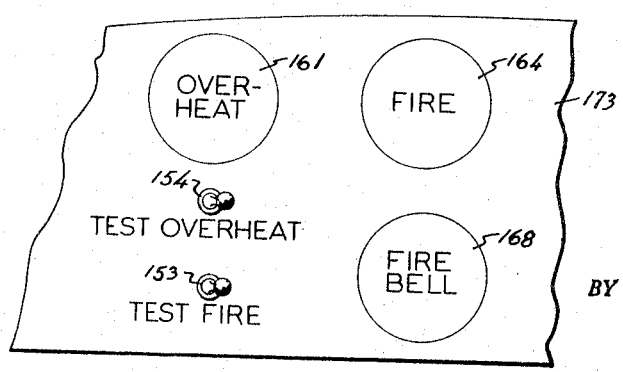
INVENTOR.
JOHN E. LINDBERG, JR.
BY
ATTORNEY

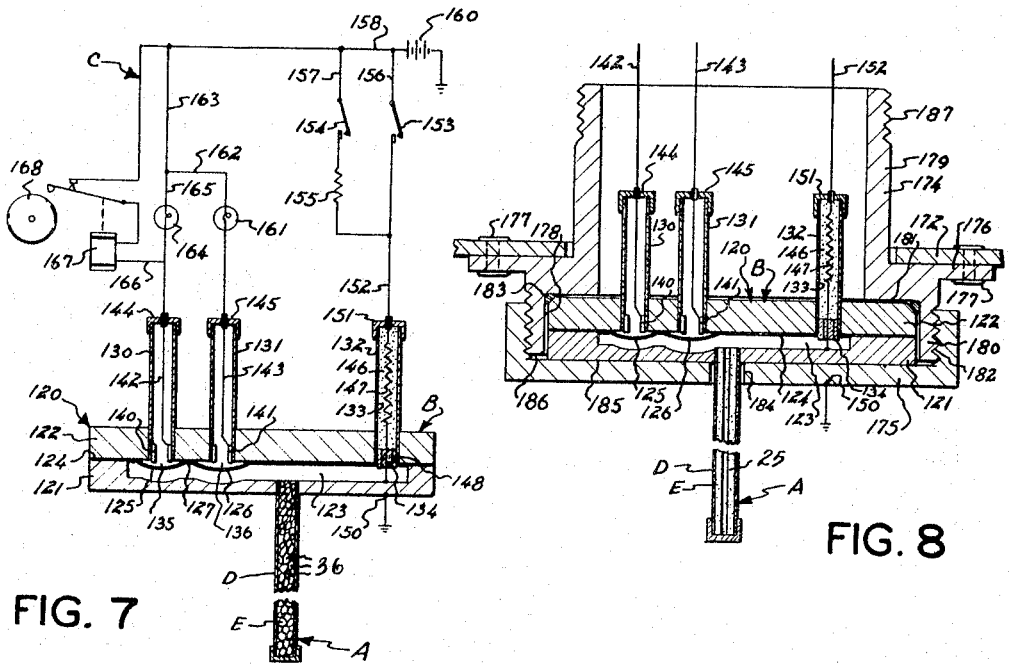
FIG. 7
FIG. 8
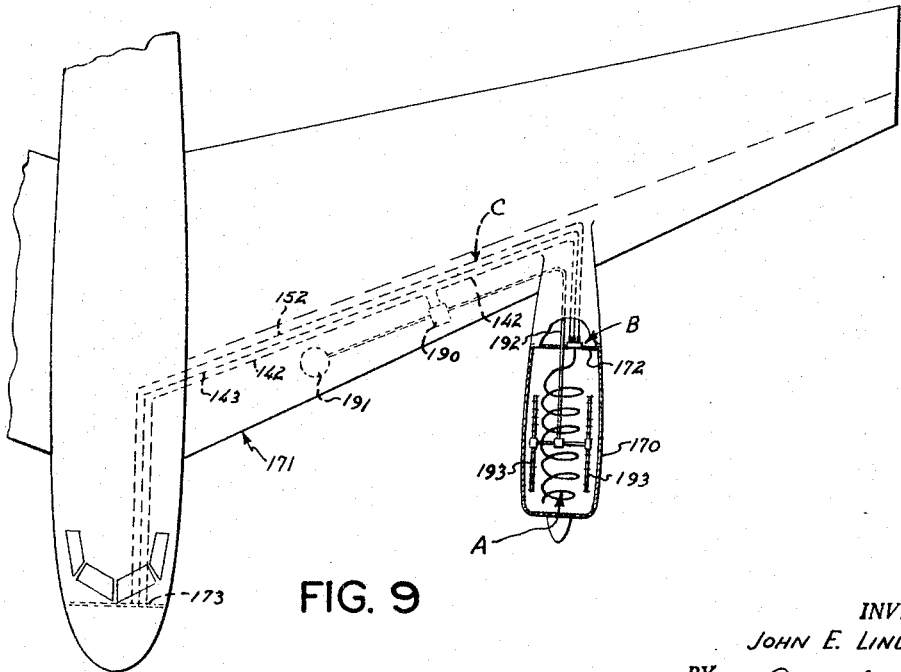
FIG. 9
INVENTOR.
JOHN E. LINDBERG, JR.
BY
ATTORNEY United States Patent Office 3,319,239
Patented May 9, 1967

3,319,239
SENSOR FOR HEAT OR TEMPERATURE DETECTION AND FIRE DETECTION
John E. Lindberg, Jr., 1024 Adrienne Drive,
Alamo, Calif. 94507
Original application Apr. 1, 1963, Ser. No. 271,043, now Patent No. 3,277,860, dated Oct. 11, 1966. Divided and this application Sept. 9, 1965, Ser. No. 516,801
5 Claims. (Cl. 340—229)

This application is a division of application Ser. No. 271,043, filed Apr. 1, 1963, now U.S. Patent No. 3,277,860, which was a continuation-in-part of application Ser. No. 102,622, filed Apr. 10, 1961, now abandoned, which was a continuation-in-part of application Ser. No. 815,406, filed May 25, 1959, now U.S. Patent No. 3,122,728.

This invention relates to improvements in heat or temperature detection and especially fire detection.

The invention is characterized by its provision of a novel non-electric heat-detecting element or sensor. Only this detecting sensor need be located in a fire zone (or other heat-detection zone), and it is connected, preferably outside the zone, to an electrical warning or corrective system, preferably by a pressure-sensitive instrument that I term a responder. The responder may be located outside the zone in which detection is desired, though usually close to it, or it may be located in that zone. The actual alarm or heat-condition indicator can be connected to the responder by a wire of practically any desired length. For example, the non-electric heat-detecting sensor may be inside a house, the responder just outside the house, and the indicator at the fire station. Or the non-electric heat-detecting sensor may be in zone 1 of an aircraft engine, ahead of a fire wall; then the responder may be on either side of the fire wall and the indicator on the aircraft instrument panel.

Furthermore, the novel heat-detecting sensor may be filamentary—a long, very-narrow-diameter, hollow tube. It may extend along a line, around a circle, or along any desired path and for quite a considerable length.

One object of the present invention is to provide a system which will both: (1) detect and warn when the arithmetically *average temperature* of a long (e.g. 20-foot) continuous detecting element or sensor exceeds a pre-set warning level (e.g., 350° F.), and (2) give a fire warning when *any small section* of the sensor—e.g., about ¼" long—exceeds the fire temperature, e.g., 1500° F. or above. In a particular embodiment, the system will also give additional overheat warning at both a different average temperature and when the small section, e.g., about ¼" long, exceeds a chosen temperature in between the set average and the fire temperatures.

An additional object is to provide a device capable of indicating average temperatures in two well-defined temperature ranges. Further, sharp changes in the pressure-temperature response characteristics, which occur at the transition point between these two ranges, may be utilized to indicate certain temperature conditions.

A further object is to provide apparatus for detecting two different average temperatures with a single instrument.

Another object of the invention is to enable the use of several non-electric heat-detecting transducers in combination with a single electrical circuit, to achieve simplicity while still pin-pointing which transducer has been actuated and to what extent it has been actuated.

Other objects and advantages of the invention will appear from the following description of several preferred embodiments thereof.

In the drawings:

FIG. 1 is an enlarged view in elevation and in section of a simplified form of fire-detection system. It shows the responder and a heat-detection sensor that is broken in the middle to conserve space. The electrical circuit is shown diagrammatically.

FIG. 2 is a greatly enlarged view in elevation and in section of a portion of one preferred form of a heat-detection sensor of this invention, being the same one as that shown in FIG. 1, in a fully outgassed state.

FIG. 3 is a view like FIG. 2 of the same sensor in a fully ingassed state.

FIG. 4 is a view similar to FIG. 2, of a modified form of sensor, also embodying the principles of the invention.

FIG. 5 is a view similar to FIG. 2, of another modified form of sensor.

FIG. 6 is a graph plotting internal sensor pressure as a function of its average temperature in a particular application of the invention.

FIG. 7 is a view similar to FIG. 1, of a responder and electrical circuit, in a heat-detection system employing a single sensor (like that of FIG. 5) to indicate both fire conditions and overheat conditions at a level below the fire level. The system also includes a test mechanism.

FIG. 8 is a fragmentary view in elevation and in section, of a fire wall installation of a responder like that of FIG. 7.

FIG. 9 is a fragmentary, somewhat diagrammatic plan view of an aircraft having a system like that of FIG. 7, installed along with a fire extinguisher system.

FIG. 10 is a fragmentary view in elevation of a portion of the instrument panel of the aircraft of FIG. 9, showing two warning lights, a bell, and two test-switch buttons.

FIG. 11 is a simplified diagrammatic view, partly in elevation and in section, of a system incorporating several fire detector units of the type depicted in FIG. 7 combined with a single electrical circuit.

FIG. 12 is an enlarged view in elevation and in section of a portion of a fire-detector responder of this invention, incorporating a modification also utilizing the principles of the invention.

A. GENERAL STATEMENT OF THE INVENTION

As shown in FIGS. 1 and 2, the fire detection system of this invention comprises (1) a non-electric detection means, preferably in the form of a generally filamentary sensor A of indeterminate length, (2) a responder B, and (3) an electrical circuit C. The function of the sensor A is to actuate the responder B, and the function of the responder B is to actuate the electrical circuit C in response to predetermined conditions of temperature obtaining in the environment within which the sensor A is located. Thus, the senor A and the responder B, considered together, comprise a transducer.

The sensor A may be further defined in general terms (see FIGS. 1–5) as a generally filamentary enclosure D of extended length connected to the responder B and containing means E responsive to heat in the environment of the sensor A, for raising the pressure in the responder B.

The responder B may be thought of as typically a pressure-actuated electrical switch that opens or closes the electrical circuit C in response to pressure changes induced by the sensor A as a result of the effect of temperature on the sensor A.

The electrical circuit C may be a warning circuit or a remedial circuit. Several responders B may be used in one circuit, if desired, to control it in some manner that depends on the temperature conditions of the environments to which the sensors A are exposed.

B. THE SENSOR A (FIGS. 1–5)

The fire detector of this invention, includes a novel detecting means or sensor A. The sensor A has a gas-tight enclosure D, preferably comprising a narrow-diameter metal tube of constant cross-sectional area and of any desired length. Within this enclosure D is a selected metallic hydride E responsive to the temperature of the enclosure D to releasing hydrogen for varying the pressure inside the enclosure D, acting as a transducing or gas-liberating agent. Preferably, the enclosure D also contains a noble gas such as argon, which acts as a temperature averaging device and also performs several other key functions that will be explained later. The only opening in the enclosure D is connected to and sealed to the responder B, which itself defines a closed chamber connected to the enclosure D. An alteration of the internal pressure within the enclosure D therefore affects the responder B.

1. Discrete temperature detection—indication when even a fraction of an inch of the sensor reaches a critical temperature

(A) THE METALLIC HYDRIDE E

The metallic hydrides E used in this invention release large volumes of hydrogen gas when elevated to a temperature sought to be detected and take up this hydrogen when cooled. Although these hydrides and some of their characteristic phenomena have been observed for many years, the main practical applications of them heretofore have been in the vacuum tube industry, where the metals that form these hydrides are used to take up or "getter" residual gases in the tube after sealing. Therefore, the metals of these hydrides have been known as "getters."

With the alkali and alkaline earth metals, i.e., Groups I–A and II–A of the periodic table, hydrogen forms stoichiometric ionic compounds, such as sodium hydride and calcium hydride, in a reversible reaction. Specifically, hydrogen reacts with lithium, sodium, potassium, rubidium, cesium, calcium, strontium, and barium, in stoichiometric proportions to form hydrides. However, for airplane fire detection these materials are unsatisfactory, because of the low melting points of the metals, which makes them prone to flow and plug the tube D. Moreover, these hydrides react rapidly and often violently with water or even, air, so that if the encasing tube were broken, a violent reaction would ensue, possibly starting a fire and possibly giving a false alarm.

With the elements of Groups III–B (including the rare earth and actinide elements), IV–B, and V–B of the periodic table, and with palladium, hydrogen forms hydrides of a different type. The amount of hydrogen that combines with or dissolves in these elements varies directly with the square root of the pressure, and it decreases with increase in temperature. They do not react violently with water and do not melt except at very high temperatures. These are the metals whose hydrides are used in the airplane fire detector of the present invention. Broadly, the class consists of scandium, titanium, vanadium, yttarbium, zirconium, niobium, palladium, hafnium, tantalum, the rare earth metals (atomic numbers 57 through 71), and the actinide metals (atomic numbers 89 through 103), and alloys thereof. As a practical matter, however, most of the actinides can be eliminated because of their great cost and radioactivity. So can most of the rare earth metals and some of the others, because of cost or unavailability, the most practical metals being titanium, vanadium, zirconium, palladium, niobium, and tantalum. Hafnium is found in zirconium as a trace impurity and appears to act like zirconium. Alloys such as titanium-zirconium and titanium-vanadium are also useful and practical. Examples of the sorptive capacities as a function of temperature of some of these materials are given in Tables I and II.

TABLE I.—SORPTION OF HYDROGEN BY TYPICAL METALS OF GROUP B

[In cm.$^3$ (S.T.P.) per gm., at 1 atm]

| Temperature ° C. | Titanium | Vanadium | Zirconium |
|---|---|---|---|
| 20 | 407.4 | 150 | 235.5 |
| 400 | 387.7 | 38 | -------- |
| 600 | 334.7 | 10 | 184 |
| 800 | 140.9 | 4.4 | 165 |
| 1,000 | 66.1 | 2.5 | 78 |

TABLE II.—HYDROGEN CONTENT OF CERTAIN HYDRIDES AT ROOM TEMPERATURE

| Metal | Hydrogen content (S.T.P.) in cc. hydrogen per cc. of metal |
|---|---|
| Titanium | 1,950 |
| Vanadium | 900 |
| Zirconium | 1,450 |
| Hafnium | 1,650 |
| Tantalum | 760 |
| Palladium | 840 |
| Niobium | 465 |
| Ruthenium | 1,500 |
| Rhodium | 1,250 |
| Lanthanum | 1,475 |
| Cerium | 1,640 |
| Praseodymium | 1,470 |
| Neodymium | 1,070 |
| Thorium | 1,660 |

The amounts of hydrogen contained are thus very large, so that substantial pressure changes result upon its release. This means that a long continuous sensor tube D with about half its cross-section filled with hydride will produce a tremendous pressure increase when even a small portion of its length is heated to a fire temperature; a twenty-five foot tube can have a marked change in pressure when only one-quarter of an inch is heated to 1500° F., the rest of the tube remaining at room temperature.

These materials, when located within a closed chamber, thus provide an effective means of altering the internal pressure of the chamber, in accordance with the temperature of all or of only a small portion thereof. This internal pressure is a function of the temperature applied to the material. In general, above a threshold temperature an increase in pressure results from each incremental increase in temperature. Thus, the enclosed material functions as an element which effectively converts temperature variations into pressure variations, and for that reason the hydrides used here may be thought of and referred to as "transducing agents."

(B) A WRAPPED GETTER FILAMENT (FIGS. 1–3)

FIGS. 1–3 show a preferred form of transducing agent E enclosed in the sensor tube D. Here the transducing agent E is a filament 25, such as zirconium wire, and may be about 0.005" to 0.020" in diameter, for example. A ribbon 26 of suitable material, such as molybdenum, tungsten, platinum, and rhenium, preferably about 0.020" wide and 0.002" thick, is wrapped tightly around the filamentary transducing agent 25 and fits within the tube D. The ribbon 26 physically spaces the filament 25 from the walls 27 of the tube D and prevents the transducing agent 25 from fusing or welding to the tube walls 27, even in the event that the sensor A is exposed to extreme heat. The ribbon 26 and wrap 27 fill approximately half of the space inside the tube D, leaving the remainder available for passage of the gas and transmission of the pressure changes along the tube. The spiral space between successive turns of the ribbon 26 may provide the passage means for the gas when the wire 25 is fully ingassed so that the ribbon 26 is forced substantially into contact with the tube walls 27. The strip 26 should be wound to fully cover the wire 25; even overlapping will not stop the passage of hydrogen, and ideally a pitch equal to the axial width of the spirally wound strip is preferred.

Other porous non-reactive barrier wraps may be used around the filament 25, such as plated or woven wire meshes 28 of molybdenum or platinum (see FIG. 4), resembling the typical shielding sleeving familiar in electronics, except that here the size is smaller.

An important function of the barrier wrap 26 or 28 is to assure passage for gas at all times through the tube D between the core or filament 25 and the walls 27. Even if the tube D is mashed or hammered down or bent double and hammered, the irregularity provided by the wrap provides a passage through which hydrogen can pass freely, hydrogen being the most mobile of gases.

As a simplified example of installation of the sensor A of FIG. 2 to the responder B, one end 30 (FIG. 1) of the tube D may be connected by a gas-tight seal to the responder B, while the other end 31 of the tube D is still open. This free end 31 may be connected to a vacuum pump and the tube D pumped free of gas. Then the tube D is heated, pure hydrogen is forced in through the free end 31, and then the zirconium filament 25 absorbs the hydrogen while it cools. The originally pure metal 25 is converted into an ingassed hydride, expanding about 15% as it does so. The molybdenum wrap 26 moves and expands somewhat to accommodate this. The fully ingassed (expanded) state is shown in FIG. 3, while the fully outgassed (reduced) state is shown in FIG. 2. The free end 31 is then sealed off, and the device is ready for operation. While this fairly crude procedure illustrates the general principle, a refined method giving more consistent and greatly improved results is disclosed in my U.S. Patent No. 3,153,847.

As stated, it is preferable that the spaces between successive edges of the ribbon 26 in its spiral wrap be as close together as possible, though the sensor will function satisfactorily with a reasonable gap or with overlap. There is no difficulty in getting the gas to go in and out due to any pressure of one wrap on the other. The desire for the minimum spacing between laps is that if any small particle could get out through the space between laps, it then might react with the encasing tube. To picture this, one must understand that in the process of ingassing, the hydride grows approximately 15% (see FIGS. 2 and 3), and on its ingas/outgas cycling, this change in dimension often results in fracture of the wire 25, inasmuch as the hydride is highly brittle. Normally, the filament 25 and the ribbon 26 break into segments which have a length of approximately 1 to 10 times the diameter of the filament 25. But, in such fracture, it is always possible that a small granule is separately fractured, and if it could pass through a space between successive laps of the spiral wrap, it would outgas upon being heated during operation and then the getter metal would tend to react with the encasing tube and cause failure of the tube. By properly wrapping the wire 25 with the ribbon 26 with minimum space between laps, such fragments are retained inside the ribbon wrap and cannot gain access to the tube wall 27.

In using the molybdenum wrap, care is preferably taken to shear the end of the ribbon-wrapped core in such a manner that part of the ribbon rolls over the end of the sheared getter wire, providing a retaining protective member to prevent a part of the getter from coming out of the end of this porous molybdenum containing member. Dull shears will do this. Further, to insure protection, it is desirable to add at each end of the wrapped filament 25 a short length 32 of tungsten or molybdenum filament, which may be made from several (e.g., 2 or 3) such wires twisted together. The filament 32 is of large enough diameter so that it cannot axially override the filament 25, and the filament 32 is small enough so that it does not bar the passageway to the gas. The piece 32, ordinarily about one-quarter inch to several inches long, acts as a barrier to assure that no particle of getter metal touches the reactive encasing material. Beyond the piece 32, at the end 30, a small mandrel wire (not shown) is inserted into the tube D and the walls are crimped at 33 to provide a retention means for the piece 32 and filament 25, while leaving a capillary passage 34 after the mandrel wire is withdrawn. Then one or more brazing wires 34a are installed into the end 31, into contact with the wire 32 at that end, and that end is sealed by fusing the brazing wire. Thus the wire 25 can nowhere touch the walls 27.

(C) USE OF GRANULAR MATERIALS (FIG. 5)

Between the getter and its encasing tubing employs a mixture of powdered getter metal 35 and aluminum oxide 36 (or silicon dioxide) (FIG. 5), with the oxide powder 36 so fine relative to the getter particles 35 that it coats the surfaces of the getter granules 35 and, therefore, acts as a barrier to prevent contact and resultant reaction with the tubing walls 27. It also acts as a barrier between the hydride particles 35 themselves, so that they do not interact and form larger granules which might plug the tube. The particle size of the aluminum oxide 36 is preferably in the order of a few millionths of an inch, and the granule size of the hydride 35 is preferably in the order of 200–500 mesh; however, the particle size of the hydride is less critical. The aluminum oxide or silicon dioxide 36 should be microscopic to coat and adhere properly to the hydride granules 35. Some reaction takes place between the hydride and silicon dioxide, but this causes no damage and in fact often helps by aiding in maintenance of a coated film around each granule. This system can be used in filling stainless steel and similar metal sensors and is successful in preventing reaction with its incasement. Other ceramic-type oxides, including beryllium oxide and alumina in powdered form, are also suitable.

Although only a few specific forms for the agent E have been illustrated or described, others are possible, and it is intended that their omission not be in any sense limiting or restrictive to the possible application and construction of this invention.

2. Average temperature indication

As stated earlier, the hydrogen is, at cool, normal temperatures, completely held in the metal, as a "hydride." Its release begins only at a threshold temperature and then takes place extremely rapidly, so that it can be used to indicate the reaching of a critical temperature of a very short length of the sensor, say ¼″.

However, it is also valuable for the sensor A not only to indicate when ¼″ thereof reaches a temperature of, say, 1500° F. but also to indicate when an arithmetical average temperature of a zone reaches a much lower temperature, say 350° F. This is done by the same sensor A in the present invention by incorporating therein a noble, non-reactive gas, which fills the passage area between the hydride and the tube walls to some desired pressure, e.g., one atmosphere. For this purpose, the cross-sectional passage area should be uniform, and the volume of the sensor chamber in the responder should be as small as possible.

Furthermore, the noble gas not only enables detection of a critical average temperature but also produces some other very important and quite unexpected and unpredictable results.

Also, the heat-detection apparatus of this invention, by virtue of the unique character of the relation between the temperature of the sensor A and the pressure in the sensor A, is capable of indicating average temperatures in two distinct ranges as well as giving response to relatively strong local heating at any point along the sensor A.

By way of clarification, the term "average temperature" as used here means the arithmetic average over the whole sensor A of the temperature of each incremental length of sensor. Expressed mathematically, the "average temperature" is given by:

$$T_{av.} = \frac{1}{L}\int_0^L T(x)\,dx$$

where L is the total length of the sensor, $x$ is the distance along the sensor, and $T(x)$ is the temperature of the sensor at the point $x$.

For temperatures above a certain point, known as the threshold point, the relation between the temperature of a hydride, of the type used in a sensor of this invention, and the pressure in the sensor is linear, at least within a wide working range. Below the threshold point the hydride does not liberate gas, and so the pressure in the sensor depends only upon any free gas which may be present in the sensor. As said, preferably there is a noble gas at a normal pressure of one atmosphere. The pressure-temperature relationship for the free gas is also approximately linear as governed by the laws of ideal gases. Thus the pressure-temperature relationship for a sensor of this invention is linear in the range lying wholly below the threshold point and in the range lying wholly above the threshold point, but the constant of proportionality is different in the two ranges.

The pressure-temperature curve for a typical sensor of this invention is shown somewhat schematically in FIG. 6. It will be seen that the curve consists of two straight lines, curve F representing the free noble gas and curve H representing what happens when the outgassed hydrogen is added to the gas in the tube. Curves F and H meet at the threshold point G, and the slope of curve H is much steeper than that of curve F. For temperatures entirely in the range of curve F or entirely in the range of curve H, the device of this invention will thus indicate the average temperature of the sensor. Although the effect is the same in both ranges, the mechanism responsible is different in the two cases.

In the lower range, that of curve F, the operation of the sensor A obeys the ideal-gas laws except with the point of absolute zero temperature shifted to account for the volume of the responder sensor chamber. If part of the sensor is maintained at some temperature well below the threshold point G while the rest is heated to some higher temperature still below the threshold point G, the steady-state pressure in the sensor will be proportional to the average temperature of the sensor. That is, the increase in pressure resulting from heating part of the sensor will be a definite fraction of the increase in pressure which would result from heating the whole sensor uniformly, that fraction being the ratio of the length of the heated part of the sensor to the total length (if the sensor is a tube of uniform cross-sectional area) or the ratio of the free volume in the heated part of the sensor to the total free volume (if the sensor is not of uniform cross section).

As an example, suppose one-half of a sensor which is initially at a uniform temperature of 100° F. is heated to a temperature of 500° F. (an increase of 400° F.) while the other half remains at 100° F. The increase in pressure will be one-half of that which would be measured if the whole sensor were heated to 500° F. Since the pressure-temperature relation, curve F, is a straight line, the actual increase in pressure is the same as the increase in pressure would be if the temperature of the whole sensor were increased by half as much, or to 300° F. But 300° F. is just the average temperature of the sensor when half is at 500° F. and the other half is at 100° F. Thus the device of this invention performs the desired averaging in the range below the threshold point G.

For temperatures above the threshold point G, the result is the same but the reason is different. When one part of the sensor is heated to a temperature above the threshold point G while the rest of the sensor remains at a lower temperature still above the threshold point G, the hydride in the heated part releases gas. Not all of the released gas contributes to an increase in pressure in the sensor, however, because some of the gas is taken up by the transducing agent in cooler parts of the sensor. As before, the actual increase in pressure is a definite fraction of the increase in pressure which would result from heating the whole sensor uniformly, that fraction being the ratio of the volume of the heated hydride to the total volume of hydride in the sensor. The end effect is that the pressure increase in the sensor is directly proportional to the increase of the average temperature of the sensor, within a wide working range.

The quantitive characteristics of the pressure-temperature curve for a given sensor depend upon several factors. Th slope of curve F, that portion of the curve below the threshold point G, may be increased merely by increasing the amount of free gas within the sensor, and decreased by decreasing the amount of free gas within the sensor. The slope of curve H may be changed by the degree of ingassing to which the hydride is subjected before sealing off the sensor or by the choice of the type of hydride used. These latter factors also influence the position of the threshold point G.

3. *The noble gases and the partial flame-out test*

It might be thought that an overcharge of hydrogen would be used to provide the desired free gas. However, at high temperatures hydrogen tends to diffuse through the walls of metal sensor tubes, reducing the charge and changing the characteristics of the sensor. Furthermore, there is another problem: Whether or not there is an overcharge of hydrogen there is a tendency fo the hydrogen which is outgassed from a hotter part of the not-fully-ingassed filament 25 to re-ingas into another cooler part of the same filament 25, thereby lowering the over-all pressure below what it should be. Due to the great mobility of hydrogen, this transference of hydrogen from one part of the hydride to another is very rapid indeed, and it becomes difficult, if not impossible, for such a device to pass a timed test known as "partial flame-out," which is required by the FAA for airplane fire detectors.

These problems are solved, I have discovered, by incorporating a noble gas, preferably argon, inside the tube, which is evacuated of all other gases, including hydrogen except for what is contained in the hydride. With argon incorporated, the device easily passes the "partial flame-out test."

While argon is the preferred gas, a tracer of helium may be added to the argon, for use in leak detection during manufacture or at other times. Helium may be used, if desired, as the total overcharge, but its mobility is greater than that of argon, and so it is not so good as argon. Argon is less expensive than the other noble gases (neon, krypton, xenon), which is another advantage of using it. It is important to use as the overcharge a gas that is unable to be ingassed into the getter material in any substantial amount, and argon and the gases of its family do remain inert, non-reactive with the hydride core, and unable to diffuse through the walls of the sensor tube. Moreover, the use of the noble gases inside the tube as the gas averaging device for average temperature detection is advisable because these gases do not diffuse through the walls of the tube and thus make a very stable averaging system, which is not affected in the presence of high temperatures.

4. *Noble gas in the passage helps to prevent false alarms*

As an aid in assuring freedom from false alarms, it is desirable to have the inert gas overcharge set at a pressure of one atmosphere or somewhat higher. This prevents a change of pressure upon entry of additional gas from outside, if the tube does have a small leak, and it slows down considerably the entry of such atmospheric gas. Thus, the fire detector responds normally even after such a leak for a period of time that depends upon the size of the leak. If the tube interior were at a vacuum (that is, when the hydrogen is ingassed into the hydride), a leak would mean the entry of atmospheric gas that would raise the pressure inside the tube and, when the tube was heated, the additional gas present would further increase the pressure and might actuate the responder B at a lower temperature than that for which the device was originally set. Such actuation would be a type of false alarm. By having the tube at exactly one atmosphere pressure, there is a balance which tends to keep the argon gas in the tube and to mean that even if there is a leak and an exchange of gas, the actuation point would be substantially the same as before, or lower if there were leakage of gas out during the operation. In any event, there would be no false alarm. Furthermore, if the pressure of the argon in the tube is set at a value greater than one atmosphere, the tendency for a false alarm is reduced, since it would take a higher temperature than normal to operate a device from which some argon had leaked out so as to reduce the pressure below its normal pre-set value.

C. THE RESPONDER B AND THE WARNING CIRCUIT C

Any pressure switch that is properly sensitive, has a small enough sensor chamber free volume, is sufficiently heat resistant, and has the needed connections, may be used as a responder B. However, I have invented a new pressure switch that is especially suitable for use herein. This switch is fully disclosed and claimed in a copending patent application, Ser. No. 86,252, filed Jan. 26, 1961, now U.S. Patent 3,180,956. Moreover, in the present application certain features are brought out which result in a novel cooperation between the sensor and the responder.

1. *The responder 70 of FIG. 1*

FIG. 1 shows one preferred form of responder B, comprising a unit 70 with two circular body members 71 and 72, preferably of non-porous metal, between which is bonded (as by brazing) a thin metal flexible disc or diaphragm 73. The body members 71 and 72 are hermatically sealed together and are in electrical contact for their full peripheries and over a substantial margin, but in the center of the diaphragm 73 has a shallow generally spherical-segment depression 74 called a "blister," which is free to move relative to the body members 71 and 72 and constitutes the active or movable part of the diaphragm 73. Use of a diaphragm 73 with a blister 74 makes possible the use of an upper body member 72 with a planar lower surface 75 and gives a more predictable response, but other diaphragm structures may be used where feasible. The lower body member 71 is formed with a shallow recess 76 in its upper surface, and the diaphragm 73 divides the resultant cavity between the body members into two regions or chambers 77 and 78. Of course, either body member 71 or 72 may actually be made by brazing together several thin plates of the desired configuration, and the recess 76 may be provided by using a stack of preformed thin washers over a disc. Since the lower region 77 communicates with the sensor A, it may be called the "sensor chamber." This sensor chamber 77 should be as small as possible. The other region 78 is located on the opposite side of the diaphragm 73 from the sensor A; so it may be called the "anti-sensor chamber."

A preferred material for all the metal elements in the responder 70 is molybdenum or a suitable alloy thereof. There is good reason for having the entire responder, so far as the metal parts are concerned, made from the same metal, so that at high temperatures there will not be harmful differences in expansion. Moreover, since some tests by the United States Federal Aviation Agency require that the responder, as well as the sensor, be able to withstand high temperatures, the diaphragm must be made from a metal whose qualities remain unimpaired by temperatures of at least 1000° F.

A very important qualification of the responder is that the portions exposed to the sensor interior not react with hydrogen even at quite high temperatures, so that snap-action of the diaphragm, for example, remains unaffected. Molybdenum is preferred because it answers these qualifications, and can be brazed at 2000° F. without having its strength substantially affected in an adverse manner. It should be noted, however, that pure molybdenum is too malleable to give a good snap action. Commercial molybdenum (containing about 250 parts per million of carbon and containing other impurities) is or has been satisfactory, unless it is too pure. A molybdenum alloy containing small amounts (less than 1%) of titanium or of zirconium or of both is satisfactory. It does not react adversely with hydrogen, because it is 99% or better of molybdenum and the titanium and zirconium combine with any oxygen or carbon present in the metal to form oxides and carbides and so are no longer hydrogen getters.

As brought out many times herein, I utilize molybdenum metal in novel ways. For example, the molybdenum ribbon 26 succeeds where ribbons of stainless steel, nickel, manganese, iron, aluminum, copper, etc., failed, because they reacted with zirconium, titanium, etc. to form alloys with eutectic points below the melting points of the individual metals. In the operating range herein, molybdenum solves the problem; it does not weld to the wire 25, or plug the gas passage, or form a low-melting-point alloy, and it gets stronger instead of weaker in the presence of zirconium and titanium. Again, this material is quite useful in the responder, as indicated above.

The end 30 of the sensor tube D is joined to and sealed to the lower body member 71, being brazed to a short metal tube 79 that itself is pre-brazed to the body member 71, fitting within a hole 80. The region 77 is closed and sealed except for its communication with the lumen of the sensor tube D. The interior volume of the sensor tube D is quite large compared to the chamber 77. Even the passage of the tube D—the volume not occupied by the hydride and protecting substances—is many times larger than the volume of the sensor chamber 77. Generally, the sensor passage volume should be at least 50 times as great as the sensor chamber 77 volume. And the hydride should occupy about half of the total sensor interior volume—about the same as the sensor passage. For example, a typical sensor chamber 77 of this invention has a volume of 0.00057 cubic inch. A sensor A ten feet long has a typical passage volume of 0.03 cubic inch, and a twenty-five foot sensor A has a typical passage volume of 0.075 cubic inch—about 150 times that of the sensor chamber 77. These relative proportions are important to obtain the proper sensitivity to temperature changes.

A tube 81 of non-porous ceramic material or other non-porous electrically-insulating material extends through an opening 82 in the upper body member 72 and is hermatically sealed in place there with its lower end 83 flush with the bottom surface 75 of the body member 72. The hole 82 and tube 81 are preferably centered with respect to the blister 74, on the anti-sensor side thereof. A metal electrode 84 is located inside and joined securely to the tube 81 at the end 83 nearest the blister 74, with a portion 85 of the electrode 84 extending a very short distance below the lower surface 75 of the body member 72. The amount by which the portion 85 extends below the surface 75 is carefully controlled so as to be uniform in each responder of any particular design. This geometry means that the blister 74 can make electrical contact with the electrode portion 85 when the blister 74 is forced up by pressure in the sensor chamber 77.

As shown, the electrode 84 may be a solid rod only slightly smaller than the lumen of the tube 81, in order to give good uniform contact with the blister 74 at that time and also to afford communication between the chamber 78 and the inside 86 of the tube 81. A conducting wire 87 extends from the electrode 84, preferably along the axis of the tube 81, and is brought out of the tube 81 through a hermetic seal at a sealing cap 88. The tube interior 86 and the anti-sensor chamber 78 thus are part of the same enclosure.

If sufficient pressure is applied to the sensor side of the blister 74, the blister will deflect and make contact with the electrode portion 85; and if the deflecting force is removed, the restoring force of the blister 74 will return it to its relaxed position and thus break contact with the electrode portion 85. The force necessary to do this may be chosen by proper design of the blister to accommodate a wide range of values.

2. A simple circuit C and its operation (FIG. 1)

As explained before, the responder B may be connected to an alarm circuit C which, as shown in FIG. 1, may be a simple visual indicator consisting of a lamp 90 in series with the conducting wire 87 and a source 91 of electrical current, which may be a battery, as shown, or may be a source of alternating current. A return path for the electrical circuit C may be provided by grounding either one of the plates 71 or 72 and is shown as a ground wire 92 in FIG. 1.

In operation, when a portion of the sensor A is exposed to heat at a level high enough to cause the transducing agent E to rise above its threshold temperature G, gas is liberated. This gas cannot escape from the sensor tube D except into the sensor chamber 77, where it exerts pressure upon the blister 74. This pressure tends to move the blister 74 away from the lower body member 71 and toward the upper body member 72. The pressure in the sensor chamber 77 is a function of the temperature of the sensor A, and in general there will be a rise in pressure corresponding to each incremental increase in temperature of the sensor A above the threshold temperature G. This pressure, if great enough, will cause the blister 74 to make contact with the electrode 84, but no contact will be made unless the temperature of the sensor A is at or above a definite level. Similarly, a rise in the average temperature along the complete sensor A causes a rise in pressure of the noble gas therein, which is also capable of operating the responder B.

When the sensor A is exposed to heat at a level high enough to cause the blister 74 to make contact with the electrode 84, current flows from the battery 91 through the lamp 90, the conductor 87, the electrode 84, and the blister 74 to the body members 71 and 72 and returns to the battery 91 through ground line 92. This current flow causes the lamp 90 to light and provides a visual indication that the temperature of the sensor A is at or above a certain level. When heat is removed from the sensor A, the transducing agent E cools and reabsorbs its previously liberated gas, resulting in reduction or the pressure exerted upon the blister 74. Cooling also reduces the pressure resulting from the presence of the noble gas. The blister 74 moves away from the electrode 84, breaking the electrical circuit, and the lamp 90 goes out.

In practice, the sensor A is placed in the area whose temperature is to be monitored, while the responder B may be located upon or on either side of a shielded wall or at some easily accessible area. Thus only the sensor A itself need be exposed to possible heat sources, and it contains no element of the electrical warning circuit. In this manner, protection, for the responder B and its associated alarm circuit C may be provided.

3. Some ways of setting the threshold temperature. Still other significances of inert gases (FIG. 1)

The force necessary to deflect the blister 74 against the electrode 84 can be chosen to accommodate a wide range of values by a suitable choice of mechanical parameters. Once this force is determined, the dimensions of the sensor tube D and the amount of transducing agent E may be chosen by design to provide the force necessary to obtain contact between the blister 74 and electrode 84 at a certain temperature.

In addition the mechanical design considerations, the necessary deflecting force may also be altered by precharging the anti-sensor chamber 78 with a gas under pressure or by partially evacuating it. To accomplish this, gas is forced into (or withdrawn from) the tube 81 after its attachment to the body member 71 and before it is closed by its cap 88. The required deflecting pressure against the blister 74 becomes greater as more gas is present in the chamber 78.

Alternatively, the deflecting pressure may be effectively lowered by precharging the inside of the sensor tube D and the sensor chamber 77 with gas. In this case, if the ambient pressure in the sensor chamber 77 is greater than normal, less than normal gaseous liberation from the transducing agent E is required to deflect the blister 74 against the electrode 84. Most gases may be employed for this purpose; however, ideally the gas should not react chemically with its surrounding materials. Particularly suitable are the inert gases, such as helium, argon, neon, and xenon, especially since they do not readily diffuse through most materials. As a consequence, a precharged pressure of argon, for example, may be maintained for an indefinite length of time to retain a desired biasing of the diaphragm 73, as described.

Biasing in the anti-sensor chamber 78 is important because the diaphragm 73 naturally has a temperature coefficient of expansion which tends to make the diaphragm become easier to flex as it gets hotter. This tendency can be counteracted so that even when the diaphragm 73 reaches 1000° F. or more, it operates at exactly the same sensor pressure as when it is cool. Or it can be made to become more resistant as the temperature rises, if that is desired. Generally, uniformity is desirable and is obtained by having that anti-sensor chamber 78 at a greater pressure than the sensor chamber 77. For example, if the sensor is loaded with argon at one atmosphere pressure (15 p.s.i.a.), the anti-sensor chamber 78 may be filled with argon at 23 p.s.i.a.

4. A more complex form of responder B and its associated circuit C (FIG. 7)

(A) DESCRIPTION OF THE RESPONDER 120 AND ITS CIRCUIT

When it is desirable to provide an indication of two or more heat levels within the same area, the arrangement shown in FIG. 7 is highly desirable. In addition, FIG. 7 shows a test device that enables the operator to determine whether the unit is functioning properly.

In FIG. 7 the sensor A is joined to a responder 120 at the lower of its two circular metal body members 121 and 122. The lower body member 121 is recessed to provide a cavity for a sensor chamber 123, and a thin, flexible metal diaphragm 124 is sandwiched between the body members 121 and 122 and brazed to them in an hermetic seal. The metal elements 121, 122, and 124 may be molybdenum, Kovar, or Phosphor bronze, for example. The diaphragm 124 is provided with two generally spherical depressions or blisters 125 and 126, isolated from each other by a portion 127 brazed or otherwise hermetically bonded to the body member 122.

Three ceramic or other non-porous and electrically non-conducting tubes 130, 131, and 132 are sealed into and extend through openings in the upper body member 122. The interior 133 of the tube 132 extends through a hole 134 in the diaphragm 124 directly into the sensor chamber 123, while the tubes 130 and 131 are centered directly above their respective blisters 125 and 126 and open into separate anti-sensor chambers 135 and 136. Electrode 140 and 141 at the lower ends of tube 130 and 131 extend slightly below the tubes 130 and 131 and the upper body member 122, so that the blisters 125 and 126 can each be deflected into contact with them. Conducting wires 142 and 143 from the electrodes 140 and 141 respectively extend axially through the tubes 130 and 131 and emerge through sealing caps 144 and 145.

The interior 133 of the tube 132 is filled with a heat-dissociable material 146 such as palladium hydride granules (see FIG. 5), and a generally axially extending filament 147 is embedded in this material and extends out of the lower end of the tube 132 through a small plug 148 and terminates on the lower plate 121 at a ground point 150. The plug 148 serves to retain the hydride 146 within the tube 132 but allows any gas that may be liberated from the material 146 to pass from the tube 132 into the sensor chamber 123. The upper end of the filament 147 is brought out of the tube 132 through a sealing cap 151 and is joined to a conducting wire 152.

The diaphragm 124 and its blasters 125 and 126, together with the peripheral bond 127 between and the bond around the blisters, effectively provides three chambers: the interior 133 of the tube 132 and the interior of the sensor tube D enjoy a common atmosphere with the sensor chamber 123 to the exclusion of any other atmosphere. On the other side of the diaphragm 124 are the two mutually exclusive anti-sensor chambers 135 and 136.

Just as in the device of FIG. 1, the force necessary to deflect the blisters 125 and 126 into contact with the electrodes 140 and 141, respectively, is a function of the mechanical design of the blisters, and may be chosen so that each blister 125 and 126 requires the same or a different deflecting force. In addition, this force may be changed to any desired value by precharging any of the chambers 123, 135, and 136 with an inert gas. For example, the sensor A may be heated to a desired operating point, e.g., 800° F., filled with argon at predetermined operating pressure and sealed off. The tube 130 is then filled with argon at room temperature at a pressure just sufficient to cause the blister 125 to touch its electrode 140, and the tube 130 is then sealed off. Next the sensor A is cooled to a second desired operating temperature, say 400° F., and the tube 131 is filled with argon at room temperature at a pressure just sufficient to cause the blister 126 to touch the electrode 141, and the tube 131 is then sealed off.

The conducting wires 142, 143, and 152 are part of an alarm circuit C. The conductor 152 passes to two normally open parallel test switches 153 and 154, a resistor 155 being in series with the test switch 154. From the switches 153 and 154 lines 156 and 157 lead to a main line 158, which leads to a suitable A.C. or D.C. current source, such as a battery 160. The conductor 143 is connected to a signal lamp 161, which is connected by lines 162 and 163 to the main line 158. The conductor 142 is connected to a signal lamp 164, which is connected by lines 165 and 163 to the main line 158. The conductor 142 is also connected by a line 166 to a normally close bell-ringing circuit 167, which might either be an A.C. or D.C. type, depending upon the current source 160, and is connected to the main line 158. Although a bell 168 is shown in the circuit 167, various other devices may be substituted for it, such as a buzzer or relay.

(B) OPERATION OF THE DEVICE OF FIG. 1

Assume, by way of illustration, that the sensor A, the blisters 125 and 126, and other parts are so constructed that the blister 125 will make contact with its electrode 140 when the sensor A is exposed to a fire temperature, and so that the blister 126 will make contact with the electrode 141 when the sensor A is exposed to an overheat condition substantially lower than fire temperature. For example, the fire temperature may be 450° C. and the overheat temperature may be 200° C.

Then, if the sensor A is exposed to an overheat condition of 200° C. or higher, gas from the sensor A increases the pressure within the sensor chamber 123 and deflects the blister 126 against the electrode 141. However, the blister 125 will not contact the electrode 140. Current thus flows from the battery 160 through the lines 158, 163, and 162, the lamp 161, the conductor 143, the electrode 141, the blister 126, and the body members 122 and 121, to ground through the point 150. The resulting illumination of the lamp 161 provides an indication that the temperature of the area in which the sensor A is located is at or above the critical over-heat temperature but is still below the fire temperature.

When the sensor A is exposed to the fire temperature of 450° C., more gas comes from the sensor A and deflects the blister 125 against its electrode 140. The blister 126 is still in contact with its electrode 141 and its lamp 161 is still lighted. But now current from the current source 160 also passes through both the lamp 164 and through the bell circuit 167, ringing the bell 168 and lighting the lamp 164. This provides a visual and audible indication of a fire condition in the area to which the sensor A is exposed.

If the fire is put out and the sensor A is cooled, the pressure on the blisters 125 and 126 is lowered to break their contact with their electrodes 140 and 141. The current flow then stops, the lamps 161 and 164 go out, and the bell 168 stops ringing.

(C) THE TEST CIRCUIT OF FIG. 7 AND ITS OPERATION

The circuit segment consisting of the parallel arrangement of test switches 153 and 154 in series with the conductor 152 and filament 147 provides a convenient arrangement for checking the operability of the device. As explained previously, the amount of gas liberated from heat-dissociable material, such as the hydride 146 contained in the tube 132, is a function of its temperature, and this in turn is a function of the amount of current through the filament 147. The hydride 146 is of a type that ingasses at a temperature lower than the ingassing temperature of the hydride in the sensor A. As a result, it will re-ingas its own hydrogen, and the sensor operation will not be affected by a test. Palladium hydride may be used as this material 146 when the sensor hydride is of vanadium, titanium, or zirconium.

Upon closure of the test switch 154, current flows from the current source 160 through the lines 158 and 157, the switch 154, the current-limiting resistor 155, and the conductor 152, to the filament 147 and thence to the ground point 150. The resultant heating of the hydride 146 liberates hydrogen therefrom and, since the gas cannot escape from the sensor chamber 123, it exerts pressure on the sensor side of the blisters 125 and 126. The magnitude of the current-limiting resistor 155 is chosen so that the amount of gas liberated from the hydride 146 is sufficient to deflect the blister 126 against its electrode 141 but insufficient to deflect the blister 125 against its electrode 140. The result is that the lamp 161 is illuminated, thus providing an indication that the overheat portion of the circuit is functioning correctly and that the sensor A and sensor chamber 123 do not leak.

If, now, the test switch 153 is engaged, a larger current flows through the filament 147, due to the absence of a resistor between the current source 160 and the filament 147. The increased current heats the hydride 146 to a higher temperature, with the result that more hydrogen is liberated. Assuming that the circuit parameters and the amount of hydride are chosen correctly, enough pressure can be exerted upon the blister 125 to deflect it against its electrode 140, ringing the bell 168 and lighting the lamp 164, indicating that the fire portion of the circuit is functioning correctly and also testing the sensor A and chamber 123 against leaks. When the switches 153 and 154 are disengaged, current flow through the filament 147 ceases, and the hydride 146 cools, re-ingassing its previously liberated hydrogen. The pressure in the sensor chamber 123 drops, and contact between the electrodes 140, 141 and the blisters 125, 126 is broken, resulting in the extinguishment of the lamps 161 and 164 and silence of the bell 168.

(D) DISPOSITION OF THE UNIT

As with the device of FIG. 1, only the sensor A need be exposed to the area whose temperature it is desired to monitor. The responder 120 and the alarm circuit C may be located in a readily accessible or convenient area. For example, as shown in FIG. 9, if it is desired to monitor temperatures within an engine nacelle 170 of an aircraft 171, only the sensor A need be located within the nacelle 170, while the responder B and alarm circuit C may be located behind a fire wall 172, with the lamps and switches on an instrument panel 173, where the pilot can see them. This provides a distinct advantage in that no electrical circuits need be located in an area where conditions adverse to their operation might prevail. In addition, accidental damage to the sensor A can in no way set off a false alarm, as is evident from its construction.

Although only two blisters 125 and 126 are shown in FIG. 7, more, each with its own alarm circuit, may be placed in a responder B to provide indications of several additional temperature conditions, and their omission is not intended to exclude them from the scope of the invention.

It will be noticed that a fire detector using the principles of this invention can be made very light in weight. The sensor A is a small tube with very low weight per unit length and the responder B is also quite small and light. The only additional elements in the system are the warning lights and the circuit wiring which can also be made very light weight. A fire detector system consisting of a 25-foot sensor, responder, and indicating lamps (exclusive of the wiring itself) can be made to weigh less than eight ounces—a small fraction of the weight of other fire detector systems. This fact gives this invention an obvious advantage in aircraft fire-detector installations wherein weight must always be kept to a minimum.

(E) A MOUNTING FOR THE TRANSDUCER 120 (FIG. 8)

FIG. 8 shows one way in which the plural-blister responder 120 of FIG. 7 may be conveniently mounted so that removal and replacement of the sensor A and responder B are relatively simple. In FIG. 8 the responder 120 is mounted to a fire wall 172 by means of a main body 174 and a cap 175. The main body 174 has a flange 176 that may be mounted to the wall 172 by rivets 177 or by bolts or other suitable means. The responder body members 121 and 122 fit snugly within a well 178, provided by two offset cylindrical portions 179 and 180 and a shoulder 181, all on the main body 174. The larger-diameter cylindrical portion 180 has an exteriorly threaded portion 182 on which the cap 175 may be screwed. The plate 122 is sealed to the well 178 by means of an O-ring gasket 183 or other such seal. Thus the responder 120 is held tightly in the well 178, and gas or vapor cannot leak from one side of the fire wall 172 to the other side.

The cap 175 is provided with a central axial hole 184, through which the sensor tube D may pass during assembly. The well 178 is designed a little shallower than the thickness of the responder 120, so that the lower edge 185 of the lower body member 121 projects slightly below the lower edge 186 of the main body 174; so when the cap 175 is screwed tightly onto the main body 174 it necessarily still contacts the responder body member 121 and cannot touch the edge 186 of the body 174. Therefore, it compresses the responder 120 against the gasket 183. This arrangement also assures good electrical contact between the cap 175 and the responder plates 121 and 122, especially at the ground point 150, so that the ground point for the system may be taken off either the cap 175 or the main body 174.

The upper portion 179 of the main body 174 is made spacious enough so that, upon assembly of the responder 120 into it, the caps 144, 145, and 151 pass in freely without contacting the side wall 179. At the upper end of the main body 174 a threaded portion 187 is provided to fit a suitable connector by means of which the necessary connections between the external alarm circuit C and the conductors 142, 153, and 152 are made. This may conveniently be provided, for example, by means of a well-known type of threaded amphenol fitting (not shown).

Installation and removal of the responder 120 from this mounting is a simple matter. For installation, all that need be done is to unscrew the cap 175 from the main body 174, insert the responder 120 into the well 178, slide the cap 175 over the sensor A through the hole 184, and screw the cap 175 on the threaded lower end 178 of the main body 174. The electrical fitting (not shown) then may be assembled to the conductors 142, 143, and 152 by screwing it onto the threaded portion 187 of the main body 174. Removal is as simple.

The parts 174 and 175 are preferably constructed of metal that gives good electrical contact between the cap 175 and the lower plate 121. However, this is not necessary. An equally feasible method would be to construct the fitting of an insulator and provide a ground lead line for direct connection from either the lower or upper body member 121 or 122.

5. An aircraft system that indicates both overheat and fire and also actuates a fire-extinguishing system (FIGS. 9 and 10)

FIG. 9 shows a sensor A placed in an engine nacelle 170 of a typical turbo-jet airplane 171. The responder 120 is mounted on the fire wall 172 and may signal the cockpit through the conductors 142, 143, 152. The conductor 142, associated with the fire alarm circuit as in FIG. 7, is here connected in series with an electrically-operated, normally closed solenoid valve 190 which, when actuated, discharges a sphere 191 of fire-extinguishing chemical, such as Freon 13B–1, through lines 192 and spray-nozzles 193 into the engine nacelle 170. The view is diagrammatic, rather than to accurate scale.

Overheat conditions are distinguishable from fire, and a partial view of the dashboard 173 that faces the pilot is shown in FIG. 10, where the overheat-warning light 161, the fire-warning light 164, the fire bell 168, and the test switches 153 and 154 are shown.

When fire occurs in the engine nacelle 170, the heated sensor A causes the responder 120 to react and send current to pass through the fire alarm conductor 142. This current actuates the electrically-operated valve 190 and sends fire-extinguishing fluid to the spray-nozzles 193. In addition, the current lights the lamps 161 and 164 and rings the fire bell 168. At high temperatures below fire temperature, the simple overheat-warning light 161 is lighted. Here, again, the unit is small and light in weight and is easily installed.

6. Several responders B in one alarm circuit C (FIG. 11)

FIG. 11 shows several plural-blister units 120 of the type depicted in FIG. 7, grouped electrically and mechanically. This arrangement makes it possible for one compact alarm circuit C to monitor temperatures within several areas. In addition, provision is made so that each of the responders 120 may be tested individually or simultaneously. In this arrangement, each sensor A of the four responders 120a, 120b, 120c, and 120d may, for example, be located within a different engine nacelle or within the same engine nacelle but at different locations, thereby providing indication of both overheat and fire conditions within their respective areas.

The responder 120a has three conducting-wires 200, 201, and 202; the responder 120b has wires 203, 204, and 205; the responder 120c has wires 206, 207, and 208; and the responder 120d has wires 209, 210, and 211. The conductors 200, 203, 206, and 209 are for fire warning, while the conductors 201, 204, 207 and 210 are for overheat warning, and the conductors 202, 205, 208 and 211 are the test leads.

The test wires 202, 205, 208, and 211 are all connected in parallel with each other to a lead 212 which connects them all to lead lines 213 and 214. Each lead 213, 214 has a variable resistor 215 and 216 in series with a switch element 217, 218, respectively, and with a main line 219 that is connected to an A.C. or D.C. power source 220.

Each conductor 200, 201, 203, 204, 206, 207, 209, and 210 leads to a respective indicator-lamp 221, 222, 223, 224, 225, 226, 227, and 228. These lamps are joined in parallel to the main line 219 and thereby are connected to the power source 220. A single bell circuit 230 is connected to the line 219, in parallel with the lamps, and by a lead 231 to each fire conductor 200, 203, 206, and 209 by means of rectifiers 232, 233, 234, and 235. The rectifiers 232, 233, 234, and 235 keep all the fire-warning lamps 221, 223, 225, and 227 from lighting except when actually exposed to a fire condition or a test therefor. Without the rectifiers, a fire indication in any one conductor 200, 203, 206, or 209 might light the lamps in all. A condenser 236 may be connected between the line 231 and ground to prevent arcing in the responders. The value of the condenser 236 may be, for example, 0.002 microfarad.

Operation is the same as in FIG. 7. Each sensor A acts individually through its individual responder B to affect its individual warning light in the single circuit C and to ring the sole bell. The test circuits likewise operate as in FIG. 7, with the exception that the anti-sensor sides of each responder 120a, 120b, 120c, and 120d may be pressurized at different levels, and the variable resistors 215 and 216 enable the two switch elements 217, 218 (or even one single switch element) to check all circuits. As the current through the test filaments is increased by slowly decreasing the resistance of the variable resistor 215 or 216, each responder is actuated in turn, starting with the one set for the lowest temperature. The variable resistors may be calibrated to read directly the equivalent temperature to which each responder responds. In the event that all of the sensors A and responders B in the circuit C are of identical design, and are identically pressurized, then only one setting of each resistor 215, 216 need be made, and it can be made prior to actual operation so that, when the switch 217 is engaged, all of the lamps 222, 224, 226, and 228 associated with the overheat portions of the circuit are illuminated, thereby insuring that the overheat circuits are functioning correctly, and so that when the switch 218 is engaged all the fire-warning lamps 221, 223, 225, and 227 are illuminated. The rectifiers are required whether the power source 220 is A.C. or D.C.

Although but four units are shown in the arrangement of FIG. 11, obviously more may be added or extended as desired, and each responder may be inserted into a fitting of the type shown in FIG. 8. For example, each sensor A may lead to one engine nacelle of a multi-engine aircraft, while each responder B may be mounted in the type of fitting shown in FIG. 8 on the fire wall of its engine. Then, the electrical circuit may be conveniently connected and arranged into a very compact unit on the operator-side of the fire wall.

7. Variation of the pressure in the anti-sensor chamber (FIG. 12)

As explained before, the force necessary to deflect a blister onto its respective electrode is a function of the pressure in the anti-sensor chamber. A way of changing this pressure is shown in FIG. 12, which is an enlarged view of a portion of a simplified responder 239 generally like the responder 70 shown in FIG. 1, identical numerals being applied to those parts that are identical. In addition, however, the responder 239 has a porous tube 240, which may be of porous ceramic mounted inside the tube 81 by brackets 241. The tube 240 contains a selected amount of a suitable heat-dissociated material 242, for example, vanadium hydride. Embedded in the hydride 242, which preferably is treated as described in my copending application Serial Number 65,891, filed Oct. 31, 1960, is a filament 243. Leads 244 and 245 for the filament 243 are brought out of the tube 240 through caps 246 and 247 and then pass through the walls of the tube 81 to a potentiometer 248 and a battery 249. The points where the conductors 244 and 245 are brought out through the tube 81 are sealed so that, as before, the interior 86 of the tube 81 and the anti-sensor chamber 78 enjoy a common atmosphere to the exclusion of any other.

Now, in addition to the mechanical design of the system which includes the design of the blister 74, the effective force necessary to deflect the blister 74 against the electrode 84 may be altered by sending current from the battery 249 to the filament 243 through the potentiometer 248. The magnitude of this current depends upon the setting of the potentiometer 248, and the current through the filament 243 determines the amount of gas liberated from the hydride 242. This released hydrogen passes through the porous tube 240 and increases the pressure in the anti-sensor chamber 78, exerting a force against the blister 74 that tends to counteract the deflecting force due to pressure in the sensor chamber 77. The higher the pressure in the anti-sensor chamber 78, the more the pressure that has to be generated in the sensor chamber 77 to deflect the blister 74 against the electrode 84. By altering the setting of the potentiometer 248, the effective temperature to which the responder 239 as a whole will respond may be continuously altered within the design range of the system, to respond to any of many levels of temperature. For example, suppose that the responder 239 is initially set to respond to a temperature of approximately 1500° F. If it is desired that the responder 239 not respond until the temperature reaches 2000° F., than the resistance of the potentiometer 248 is decreased so that more current flows through the filament 243, and a greater biasing force is applied to the blister 74 in the anti-sensor chamber 78. By means of a calibrated potentiometer 248, the ranges of temperature may be detected.

This design increases the adaptability of the responder to many situations. The responder-sensor combination may be used to monitor a certain temperature within a certain area and, when this is completed, the unit may be removed and, by adjusting the potentiometer 248 to a previously calibrated setting, it may then be inserted into another area to monitor a different temperature level. This design obviously can be employed in either or both tubes of a plural-blister responder like that of FIG. 7. Moreover, when the current through the filament 243 is cut off, the responder 239 functions just like the responder 70 of FIG. 1.

D. INDICATION OF SPOT TEMPERATURES

The foregoing discussion of the averaging effect of the sensor of this invention assumes that the entire sensor is either above the threshold point G or below the threshold point G. It is not difficult to imagine situations wherein this condition is not satisfied, for example, where a local high-temperature fire exists at one small region of the sensor while the rest of the sensor is at a much cooler ambient temperature. In such a situation where all but a small part of the sensor is below the threshold point G, an interesting and extremely useful effect is observed.

Since the curve H is so steep (the ratio of the slopes of the curves F and H may be 150 or more), it is not necessary to heat the sensor vary much above the threshold temperature (the temperature at the threshold point G) to produce quite high pressures in the sensor. With the responder of a heat detector like that shown in FIG. 1 set to respond at a given pressure in the vicinity of the threshold pressure (the pressure at the threshold point G), it is not necessary to heat even a small part of the sensor very much above the threshold temperature to cause the sensor to rise high enough to actuate the responder. It will be seen that the temperature at which actuation occurs is very sharply defined and close to the threshold temperature, and is only slightly affected by the amount of the sensor which is heated. This insensitiveness of the operating temperature to the amount of sensor heated is a very important feature in a fire detector and is a direct result of the extreme steepness of the pressure-temperature curve above the threshold point G.

It may be remarked that the separate functions, averaging and sensitivity to local heating above the threshold temperature, are independent. The internal pressure of the sensor is always a measure of its average temperature and the provision for sensitivity to local heating does not change this fact. Thus this invention provides for two independent functions in one device with one sensing element. This accomplishment has not previously been achieved in the design of heat-detecting instruments.

The sharp change in internal pressure at the threshold point G may be used to indicate local temperature conditions. For example, using the system of FIG. 7, suppose that zirconium hydride is employed as the transducing agent E. The blister 125 may be designed to deflect against the electrode 140 under a pressure of 25 p.s.i.a. in the sensor chamber 123; and the blister 126 may be made to deflect against its electrode 141 under a pressure of 20 p.s.i.a. in the sensor chamber 123. The volume of the tube D, the amount of the transducer agent E, and the initial precharge pressure of gas (e.g., argon) may be chosen to correspond to a threshold point G of 1030° F. producing a 25 p.s.i.a. pressure. This temperature corresponds to fire conditions. Thus, when the sensor A is exposed to heat below the 1030° F. level, the internal pressure and temperature obey the linear relation corresponding to curve F of FIG. 6. The diaphragm blister 125 will also be actuated by an average sensor temperature of, say, 500° F., when all points thereof are below the outgassing threshold temperature G.

As the temperature is raised from the ambient atmospheric temperature, though still well below 1030° F., eventually an average temperature will be reached at which the average internal pressure inside the sensor A equals 20 p.s.i.a. At this temperature, which may be 300° F., the blister 126 is deflected onto its electrode 141 and energizes the lamp 161. The blister 126 will also be deflected at, say, 1000° F. by the outgassing hydride if even a few inches of the sensor are at this temperature. Thus, when the lamp 161 lights, it indicates an average sensor temperature of 600° F. or a discrete temperature of 1000° F.

Sharper detection of the threshold point G is obtained by eliminating the inert gas and operating the agent E under vacuum conditions, thereby making it possible to detect a threshold temperature applied to only a short length of the tube D. As before, choice of the agent E, its degree of ingassing, and the sensitivity of the responder B may be varied to change the threshold point G. Alloys of agents E may be used.

The sensor element A described heretofore have been of the type in which the transducing agent E is distributed substantially uniformly nad continuously throughout the sensor tube D. However, this is not always essential and in some cases it may be preferable to have the transducing agent E discontinuous.

To those skilled in the art to which this invention relates, many changes in construction and widely differing embodiments and applications of the invention will suggest themselves without departing from the spirit and scope of the invention. The disclosures and descriptions herein are purely illustrative and are not intended to be in any sense limiting.

I claim:
1. A fire and overheat detection system comprising
   a tube containing metallic hydride of the type that releases large quantities of gas when heated,
   a diaphragm,
   a housing divided by said diaphragm into three chambers, namely, a sensor chamber in communication with said metallic hydride and the gas emitted therefrom and first and second anti-sensor chambers isolated from each other and said sensor chamber,
   a switch in each said anti-sensor chamber and actuated by said diaphragm at a different pressure level for each said anti-sensor chamber, and
   an electrical circuit for each said switch and actuated thereby, each said circuit including an indicator actuated by said circuit.
2. The system of claim 1 wherein there is a test device for each circuit, said test device comprising
   a second tube in communication with said sensor chamber and containing a second charge of a second metallic hydride which ingasses hydrogen at a lower temperature than the metallic hydride in said tube,
   an electrical heating element for said second charge,
   a current source, and
   a pair of switches in parallel, each connecting said source to said heating element in a series arrangement of different resistance levels, one to actuate each of said switches in said anti-sensor chambers.
3. The system of claim 1 wherein each said anti-sensor chamber is at a different internal pressure.
4. A fire detection system comprising
   a plurality of filamentary enclosures of extended length,
   metallic hydride in each said enclosure of of the type responsive to the heat of fire for markedly increasing the pressure within said enclosure,
   a pressure-actuated electrical switch at one end of each said enclosure, and
   a single electrical circuit incorporating a plurality of branches in parallel with each other, each branch including one said switch and an indicator actuated by closure of its associated switch.
5. The system of claim 4 having a single audible warning device in said circuit actuated when any of a selected group of said switches closes.

References Cited by the Examiner

UNITED STATES PATENTS

| | | | |
|---|---|---|---|
| 436,045 | 9/1890 | McElroy | 200—140 |
| 2,787,130 | 4/1957 | Kaufman | 73—386.2 X |
| 3,014,206 | 12/1961 | Salvin | 340—229 |
| 3,122,728 | 2/1964 | Lindberg | 340—229 |
| 3,180,956 | 4/1965 | Lindberg | 340—229 |
| 3,221,319 | 11/1965 | Lindberg | 340—229 |

NEIL C. READ, *Primary Examiner.*

D. YUSKO, *Assistant Examiner.*